Jan. 19, 1937.　　M. H. HARRIS　　2,068,103
SPECTACLE LEVEL
Filed Jan. 15, 1936
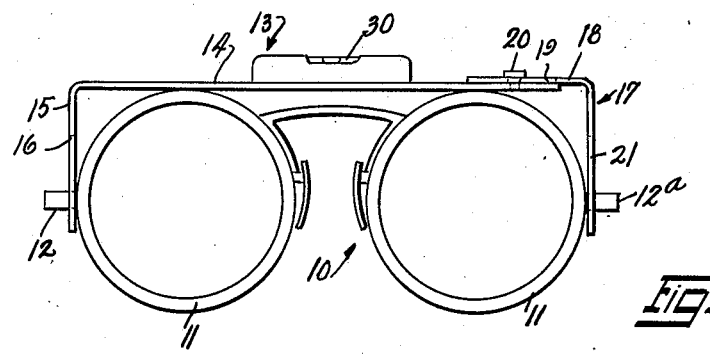
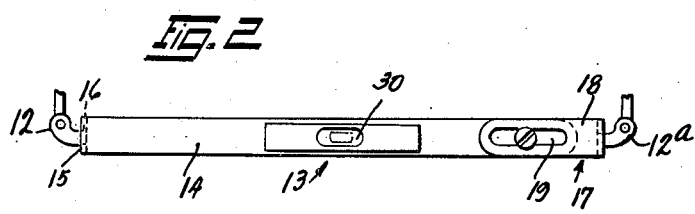
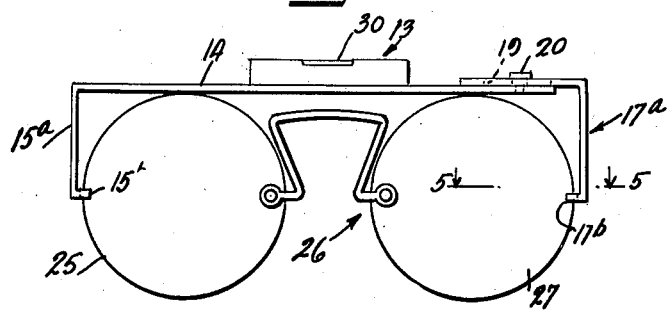
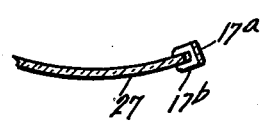
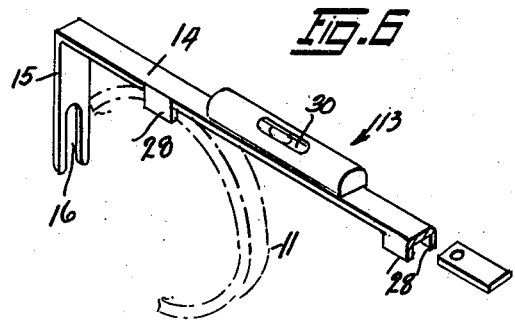
INVENTOR.
Moses H. Harris
BY
ATTORNEY.

Patented Jan. 19, 1937

2,068,103

UNITED STATES PATENT OFFICE 2,068,103

SPECTACLE LEVEL

Moses H. Harris, New York, N. Y.

Application January 15, 1936, Serial No. 59,209

5 Claims. (Cl. 33—207)

This invention relates to levels especially adapted for use in connection with spectacles or eye glasses.

One of the objects of the invention is the provision of a level of this character having a frame provided with means for engagement with the eye glass lenses or spectacle frames for properly locating the level on the spectacles or eye glasses.

Another object of the invention is the provision of a level of the nature referred to in which the aforementioned locating means are adjustable so that the level may be used in connection with various sizes of eye glasses or spectacles.

Another object is to produce a device of the character described in which the maximum simplicity of construction and operation is secured.

Other objects and advantages will appear as the nature of the improvements is better understood, the invention consisting substantially in the novel arrangement and correlation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a front view of a pair of spectacles with my improved level in position thereon;

Fig. 2 is a top plan view thereof;

Fig. 3 is an end view looking from the right of Fig. 1;

Fig. 4 is a front view of a pair of rimless eye glasses showing a modified form of my level as applied thereto;

Fig. 5 is a fragmental sectional view taken on line 5—5 Fig. 4 and

Fig. 6 is a further modified form of my invention.

Referring now to the drawing in detail 10 indicates a pair of spectacles provided with rims 11 carrying bow hinges 12 and 12a. Resting upon the top of the rims 11 is a level 13 mounted upon a base 14 which is provided at the left end thereof with an arm bent 15 having a slot 16 in engagement with the hinge 12. Secured to the opposite end of the base 14 is an inverted L shaped bracket or member 17, the upper leg or arm 18 of which is provided with a slot 19 through which passes a stud or screw 20 which screws into the base 14. The end or side arm 21 is provided with a slot 22 in locating engagement with the ear or hinge 12a. The L shaped member 17 may be slid inwardly or outwardly by loosening the screw 20 so as to fit over a pair of smaller or larger spectacles.

In the form of my invention shown in Figs. 4 and 5, the arm 15a at the left of the base 14 is provided with a horizontally bent fork 15b which is in direct engagement with the lens 25 of a pair of eye glasses 26. The adjustably mounted or right hand member 17a is provided with a fork 17b similar in all respects to the fork 15b and is adapted to engage the lens 27 at or near the edge thereof.

In Fig. 6 I have shown a modified form of my invention wherein in addition to the locating means at the right and left of the device, I provide sets of ears 28 depending from the base 14 which are adapted to span or straddle the rims 11 to more securely seat the level on the spectacle frame.

In practice the arm 17 or 17a is first adjusted to required position and then the level is located in position on the spectacles or eye glasses with the base 14 resting on the spectacle rims or on the eye glass lenses and then the amount of unalignment of the rims or lenses is determined by the spirit bulb 30 of the level.

From the foregoing, it will be seen that I have provided a simple and efficient level adapted for use in connection with rimmed or rimless eye glasses or spectacles I desire it understood that wherever in the claims the term "spectacles" is used, the term "eye glasses" is to be included.

Having described my invention what I claim as new and desire to secure by Letters Patent is:

1. A level for use in combination with spectacles, comprising a base, a spirit tube carried thereby, a forked arm at one end of the said base for engaging one end of the spectacle frame, a second forked arm slidably and adjustably mounted at the opposite end of the base for engaging the opposite end of the spectacle frame, and means for securing the said second forked arm to the base in adjusted position.

2. A level for use in combination with spectacles, comprising a base, a spirit tube carried thereby, a vertically depending arm at one end of the base, a horizontally disposed forked extension on the said arm for engagement with the spectacles at one end thereof, a second arm slidably and adjustably mounted at the opposite end of the base, and a horizontally disposed forked extension on the said second arm for engagement with the opposite end of the spectacles.

3. A level for use in combination with spectacles, comprising a base, a spirit tube carried thereby, a forked arm at one end of the said base for engaging one end of the spectacle frame, a second forked arm slidably and adjustably mounted at the opposite end of the base for engaging the opposite end of the spectacle frame and sets of ears depending from the base for the purpose specified.

4. A level for use in combination with spectacles, comprising a base, a spirit tube carried thereby, a vertical forked arm at one end of the said base for engaging one end of the spectacle frame and an adjustably mounted bracket at the opposite end of the base, the said bracket comprising a slotted horizontal arm, a bifurcated vertical arm, and a stud for securing the bracket in adjusted position.

5. A level for use in combination with spectacles, comprising a base, a spirit tube carried thereby, a forked arm at one end of the said base for engaging one end of the spectacle frame and an adjustably mounted bracket at the opposite end of the base, the said bracket comprising a slotted horizontal arm, a vertical arm, a horizontal bifurcated extension at the bottom of the vertical arm, and a stud for securing the bracket in adjusted position.

MOSES H. HARRIS.